United States Patent [19]
Pearson

[11] 3,883,549
[45] May 13, 1975

[54] FLUORESCENT ARYL 3,3-PYRAZOLYL-2-PYRAZOLINES

[75] Inventor: Ian Pearson, Harlow, England

[73] Assignee: Minnesota Mining and Manufacturing Company, St. Paul, Minn.

[22] Filed: Feb. 5, 1973

[21] Appl. No.: 329,328

[30] Foreign Application Priority Data
Feb. 10, 1972 United Kingdom.................. 6384/72

[52] U.S. Cl. 260/310 D; 117/33.5 T; 252/301.3 W; 260/310 H; 260/310 R
[51] Int. Cl............................................ C07d 49/28
[58] Field of Search................................. 260/310 D

[56] References Cited
OTHER PUBLICATIONS

Brain et al., J. Chem. Soc. (London), 1958, pp. 2486–2489.
Panizzi, Gazz. Chim. Ital., Vol. 77, pp. 549–556 (1947).
Finar et al., I, J. Chem. Soc. (London), 1961, pp. 2733–2738.
Finar, J. Chem. Soc. (London), 1961, pp. 674–679.
Finar et al., II, J. Chem. Soc. (London), 1959, pp. 1819–233.

Primary Examiner—Natalie Trousof
Attorney, Agent, or Firm—Alexander, Sell, Steldt & DeLaHunt

[57] ABSTRACT

Aryl-3,3'-pyrazolyl-2-pyrazolines are found to fluoresce when irradiated with ultraviolet light. These compounds have the generic formula:

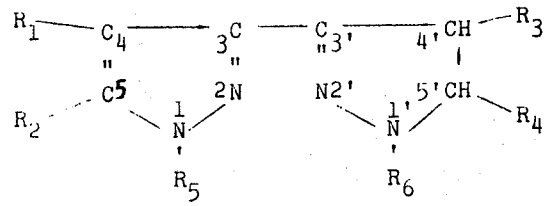

wherein $R_1 - R_4$ independently represent a hydrogen atom, alkyl, or aralkyl group and $R_5$ and $R_6$ independently represent an aryl group.

7 Claims, No Drawings

FLUORESCENT ARYL 3,3-PYRAZOLYL-2-PYRAZOLINES

This invention relates to fluorescent pyrazolines and to their preparation and use as fluorescent materials.

According to the invention there is provided an aryl-3,3'-pyrazolyl-2-pyrazoline having the general formula:

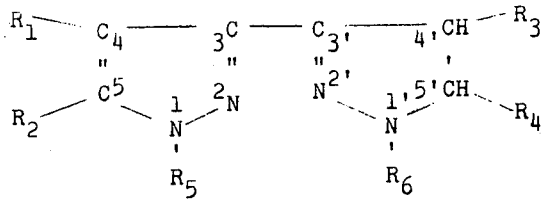

in which $R^1$ to $R^4$ each independently represent a hydrogen atom or an alkyl (preferably one containing from 1 to 4 carbon atoms) or aralkyl group, and $R^5$ and $R^6$ each independently represents an aryl group. The aryl groups used in the practice of this invention, including those in the aralkyl moieties, are phenyl and naphthyl, or phenyl and naphthyl having one or more substituents such as alkyl, aralkyl, alkoxy, alkylthio, carboxy, carbalkoxy, halogen, amino, cyano, etc. Preferably the alkyl groups in these moieties contain 1 to 4 carbon atoms.

Preferably $R^1$ and $R^3$, $R^2$ and $R^4$ and $R^5$ and $R^6$ are each identical so that the general formula is in effect:

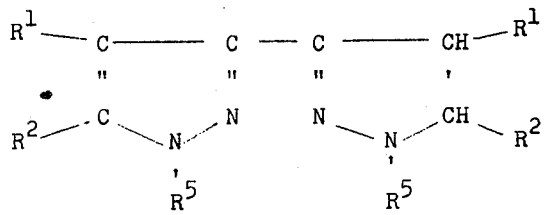

in which $R^1$, $R^2$ and $R^5$ are as defined above.

These pyrazoline compounds according to the invention fluoresce when irradiated. Generally they show a powerful blue-green fluorescence when irradiated with ultra-violet light, e.g., of wavelengths of from 300 to 450 mµ. These compounds are therefore useful as, for example, optical brightening agents and fluorescent pigments.

According to another aspect of the invention these aryl-3,3'-pyrazolyl-2-pyrazoline compounds can be prepared by reacting under anhydrous conditions at least one 1-aryl-pyrazolidin-3-one having the general formula:

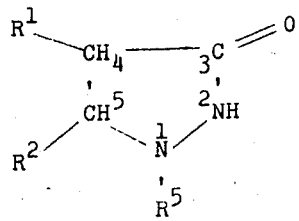

in which $R^1$, $R^2$ and $R^5$ are as defined above, with phosphorus oxychloride in the presence of an organic base. After completion of the reaction, the reaction mixture can be neutralized to give an insoluble precipitate of the desired compound. This can then be purified by recrystallization.

Preferably the organic base is an aromatic compound, e.g., one containing a tertiary nitrogen atom.

Suitable bases are the pyridines, pyridine itself being preferred. To avoid quaternization of the pyridine during reaction, pyridines blocked in the 2-position by suitable substituents, e.g., 2,6-lutidine, can be used.

Preferably a single 1-aryl-pyrazolidin-3-one is reacted with the phosphorous oxychloride to give a pyrazoline in which $R^1$ and $R^3$, $R^2$ and $R^4$, and $R^5$ and $R^6$ are identical with one another, although reacting a mixture of 1-aryl-pyrazolidin-3-ones can give pyrazolines in which $R^1$ and $R^3$, $R^2$ and $R^4$, and $R^5$ and $R^6$ differ from one another.

The reaction occurs as illustrated in the following general reaction scheme:

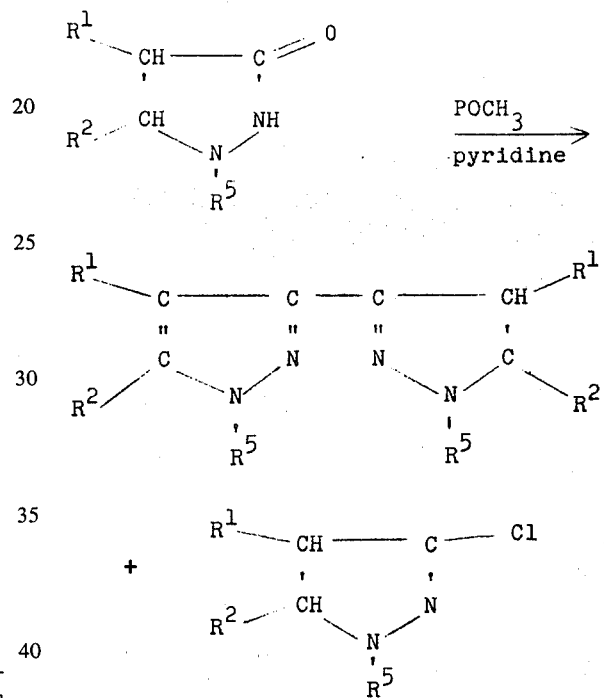

As can be seen some 3-chloro-1-aryl-2-pyrazoline is produced as a by-product. This can readily be separated from the required pyrazoline according to the invention by extraction with boiling methanol.

The 3-chloro-1-aryl-2-pyrazoline formed as a by-product is an example of certain of the 3-chloro-1-aryl-2-pyrazolines which have the general formula:

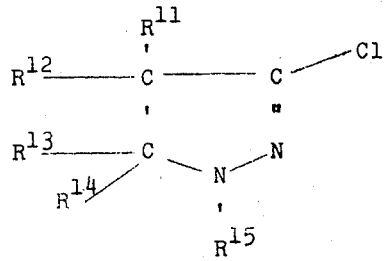

in which $R^{11}$ to $R^{14}$ each independently of each other represents a hydrogen atom or an alkyl, aralkyl or aryl, and $R^{15}$ represents an aryl group, preferably a phenyl or naphthyl group, which may be substituted in one or more positions by radicals such as a halogen atom or an alkyl, alkoxy or alkylthio group as described in copending United Kingdom Patent Application No. 6383/72.

The invention will now be illustrated by the following Examples.

EXAMPLE 1

1,1'-Diphenyl-3,3'-pyrazolyl-2-pyrazoline

1-Phenylpyrazolid-3-one (50g) was dissolved in pyridine (200 ml), the solution cooled in ice and phosphorus oxychloride (54 g) then dropped in over a period of 30 minutes. After allowing the reaction mixture to reach room temperature it was left to stand for 1 hour and then heated on the steam bath for a further 2 hours, after which time it was poured onto 2 kilograms of crushed ice.

After neutralization of the pyridine with hydrochloric acid a grey precipitate was filtered off, well washed with water and dried to give a solid (36 g). This solid was then purified by dissolving in toluene, boiling the resulting solution with charcoal for 5 minutes, and then removing the charcoal by filtration. Upon cooling the toluene solution deposited yellow needles having a powerful green fluorescence.

Further purification was effected by boiling these crystals with methanol to remove any residual 3-chloro-1-phenyl-2-pyrazoline.

The yield was 11.2 g of a solid with a melting point of 196°C and a maximum fluorescence emission in chloroform at 434 m$\mu$.

Analysis (%):
Calculated for $C_{18}H_{16}N_4$ : C 74.97; H 5.59; N 19.43; Found : C 75.35; H 5.30; N 19.63.

EXAMPLE 2

4,4'-Dimethyl-1,1'-diphenyl-3,3'-pyrazolyl-2-pyrazoline

4-Methyl-1-phenylpyrazolid-3-one (54 g) was dissolved in 2,6-lutidine (200 ml), the solution in ice and phosphorus oxychloride (54 g) added over a period of 30 minutes. The mixture was then allowed to stand for 1 hour at room temperature, followed by heating for 2 hours on the steam bath. Upon pouring onto ice and neutralizing with hydrochloric acid, a stiff grey gum as precipitated. This gum was extracted with boiling toluene, followed by treatment of the resulting toluene solution with charcoal and filtration. The toluene was distilled off and the residue recrystallized from ethanol to give a yellow crystalline solid (7.5 g; melting point 148°C) having a strong blue fluorescence with a maximum emission in chloroform at 430 m$\mu$ Analysis (%):
Calculated for $C_{20}H_{20}N_4$ : C 76.0; H 6.3; N 17.7; Found : C 75.83; H 6.9; N 16.7.

EXAMPLE 3

1,1'Di-(p-chlorphenyl)-3,3'-pyrazolyl-2pyrazoline 1-p-Chlorophenylpyrazolid-3-one (25 g) was dissolved in pyridine (200 ml), cooled in an ice bath and phosphorus oxychloride (27 g) dropped in over a period of 30 minutes. The mixture was then left for 1 hour at room temperature and finally heated on the steam bath for 2 hours. Upon pouring onto 1 kilogram of ice and neutralizing to pH 7 with hydrochloric acid, a red solid was precipitated, filtered off, washed with water and dried (13.5 g). This solid was then boiled with a mixture (200 ml) of equal parts of methanol and water. The insoluble material was filtered off, dried and recrystallized from toluene to give a fluorescent yellow solid (4 g; melting point 237°C).

Analysis (%):
Calculated for $C_{15}H_{14}N_4Cl_2$ : C 60.53; H 3.95; N 15.68; Cl Found : C 60.3; H 4.00; N 15.52; Cl 19.6

EXAMPLE 4

1,1'-Di-(p-tolyl)-3,3'-pyrazolyl-2-pyrazoline 1-p-Tolyl-pyrazolidin-3-one (19.2 g) was treated as in Example 1 with phosphorus oxychloride (25 ml) and pyridine (100 ml). Purification of the reaction mixture as in Example 1 gave 1,1'-di-(p-tolyl)-3,3'-pyrazolyl-2-pyrazoline (5.4 g) as yellow plates (melting point 236.6°C) being strong blue fluorescence with a maximum emission in chloroform at 460 m$\mu$.

Analysis (%):
Calculated for $C_{20}H_{20}N_4$ : C 76.00; H 6.37; N 17.71; Found : C 76.19; H 6.40; N 17.94.

EXAMPLE 5

5,5'-Dimethyl-1,1'-diphenyl-3,3'-pyrazolyl-2-pyrazoline

5-Methyl-1-phenyl-pyrazolidin-3-one (5.0 g) was treated with phosphorus oxychloride (16 ml) and 2,6-lutidine (25 ml) as in Example 2. Purification of the reaction mixture as in Example 2 gave 5,5'-dimethyl-1,1'-diphenyl-3,3'-pyrazolyl-2-pyrazoline (1.0 g) as yellow crystalline plates (melting point 169°C) having a strong blue fluorescence with a maximum emission in chloroform at 440 m$\mu$.

Analysis (%):
Calculated for $C_{20}H_{20}N_4$ : C 76.00; H 6.37; N 17.71; Found : C 74.34; H 6.43; N 17.48.

EXAMPLE 6

1,1'-Di-(p-anisyl)-3,3'-pyrazolyl-2-pyrazoline 1-p-Anisyl-pyrazolidin-3-one (3.8 g) was treated as in Example 1 with phosphorus oxychloride (2.5 ml) and pyridine (20 ml). Purification of the reaction mixture as in Example 1 gave 1,1'-di-(p-anisyl)-3,3'-pyrazolyl-2-pyrazoline as fluorescent yellow plates from toluene (0.8 g; melting point 266°C).

Analysis (%):
Calculated for $C_{20}H_{20}N_4O_2$ : C 68.9; H 5.80; N 16.1; Found : C 67.6; H 5.80; N 16.1.

Since all of these compounds as prepared in the above Examples fluoresce strongly when irradiated with ultraviolet light, they are useful in such applications as optical brightening agents and fluorescent pigments.

I claim:

1. An aryl-3,3'-pyrazolyl-2-pyrazoline of the formula:

$$R^1-C-C-C-CH-R^3$$

with $R^2$, C, N, N, CH, $R^4$ arranged around ring with $R^5$, $R^6$ on nitrogens wherein $R^1$ to $R^4$ independently represent hydrogen or alkyl with up to 4 carbon atoms, and
$R^5$ and $R^6$ independently represent phenyl or naphthyl which may be substituted with one substituent from the group of halogen, alkyl with up to 4 carbon atoms, alkoxy with up to 4 carbon atoms, and alkylthio with up to 4 carbon atoms.

2. An aryl-3,3'-pyrazolyl-2-pyrazoline having the formula:

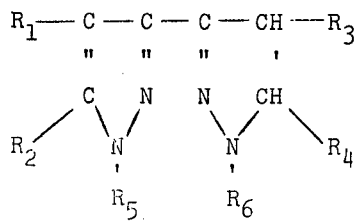

wherein $R_1$ to $R_4$ independently represent hydrogen or alkyl with up to 4 carbon atoms, and $R_5$ and $R_6$ independently represent phenyl or naphthyl which may be substituted with one substituent from the group of halogen, alkyl with up to 4 carbon atoms, and alkoxy with up to 4 carbon atoms.

3. 1,1'-Diphenyl-3,3'-pyrazolyl-2-pyrazoline.

4. 4,4'-Dimethyl-1,1'-diphenyl-3,3'-pyrazolyl2-pyrazoline.

5. 1,1'-Di-(p-chlorphenyl)-3,3'-pyrazolyl-pyrazoline.

6. 1,1'-Di-(p-tolyl)-3,3'-pyrazolyl-2-pyrazoline.

7. 5,5'-Dimethyl-1,1'-diphenyl-3,3'-pyrazolyl-2-pyrazoline.

* * * * *